United States Patent [19]

Kurywczak

[11] Patent Number: 4,954,123
[45] Date of Patent: Sep. 4, 1990

[54] RADIAL HELIX DRIVE HORSE POWER AMPLIFIER

[76] Inventor: Eugens Kurywczak, 238 Murray St., Elizabeth, N.J. 07202

[21] Appl. No.: 282,512

[22] Filed: Dec. 12, 1988

[51] Int. Cl.$^5$ .......................... F16H 1/32; F16H 1/46
[52] U.S. Cl. ...................................... 475/179; 475/348
[58] Field of Search .................. 74/801, 803, 785, 793, 74/797, 437

[56] References Cited

U.S. PATENT DOCUMENTS

| | | | |
|---|---|---|---|
| 2,209,120 | 7/1940 | Hoffman | 74/305 |
| 2,616,019 | 10/1952 | Guillot et al. | 74/785 X |
| 2,868,037 | 1/1951 | Hindmarch | 74/803 X |
| 3,090,258 | 5/1963 | Zink et al. | 74/801 |
| 3,424,021 | 1/1969 | Freudenstein | 74/437 X |
| 3,453,907 | 7/1969 | Noguchi et al. | 74/803 |
| 3,705,522 | 12/1972 | Ogawa | 74/803 |
| 3,943,780 | 3/1976 | Klaue | 74/801 X |
| 4,043,216 | 8/1977 | Steer | 74/801 X |
| 4,043,226 | 8/1977 | Buuck | 74/801 |
| 4,116,293 | 9/1978 | Fukui | 74/801 X |
| 4,366,727 | 1/1983 | Jonsson | 74/801 |
| 4,744,268 | 5/1988 | Kurywczak | 74/785 X |
| 4,788,891 | 12/1988 | Katori | 74/803 X |

OTHER PUBLICATIONS

Gear Design and Application, p. 98, by Nicholas P. Chironis, McGraw-Hill Book Company.

Primary Examiner—Dwight Diehl

[57] ABSTRACT

A horse power amplifier including a planetary gear train in a casing provided with an input shaft which is rotatably driven by a suitable power source and provided with an output shaft for transmitting a multiple of horse power to a desired location at predetermined multiples of speed and torque determined by the gear train in relation to the rotational speed and torque of the input power of the input power source.

5 Claims, 3 Drawing Sheets

RADIAL HELIX DRIVE HORSE POWER AMPLIFIER

REFERENCES

U.S. Pat. Documents
No. 2,209,120 7/1940 Hoffman
No. 4,744,268 5/1988 Kurywczak
Publications:
Minuteman-Cover Drive, on page 98 in Gear Design and Application, by Nicholas P. Chronis, McGraw-Hill Book Company.

BACKGROUND OF THE INVENTION

1. Field of the invention

The present invention generally relates to a horse power amplifier planetary device driven by a rotating power source whose amplified horse power of higher multiples of angular speed and torque as that of the power source is available at the output shaft to drive a rotatable load requiring high angular speed.

2. Relevant art

The old art power transmissions provide power transfer from a power source to a load, either at a low velocity and equally large mechanical advantage or at high velocity and equally low mechanical advantage and the horse power amplifiers provide a large mechanical advantage at velocity equal to or close to the velocity of the power source.

SUMMARY OF THE INVENTION

An object of this invention is to provide a planetary device easily adaptable for serial compounding and which at its output shaft renders a very large torque at a much higher angular velocity, than is applied to its input shaft by a rotating power source, to drive a suitable load. Realizing the object of this invention is accomplished by providing a suitable casing in which a simple planetary arrangement with an input power, by choice of design, into the input sun or the carrier that carries a compound iso-planet, whose smaller gear rolls over a braked ring gear and the larger gear drives a driver gear mounted outward from the braked ring gear on a second idler carrier which is driven by the tangential force of the moments on the iso-planet driven radius through an angular rotation isolation system. The driver gear in turn drives an idler gear mounted inward on the second carrier which drives an output sun gear or drives a larger ring gear engaging it opposite its engagement with larger iso-planet gear which by choice of design is the output element or in turn drives an output gear mounted on the casing.

These and other objects and advantages which will become subsequently apparent are forthcoming in the detailed description of construction, operation and claims.

Figure 1:
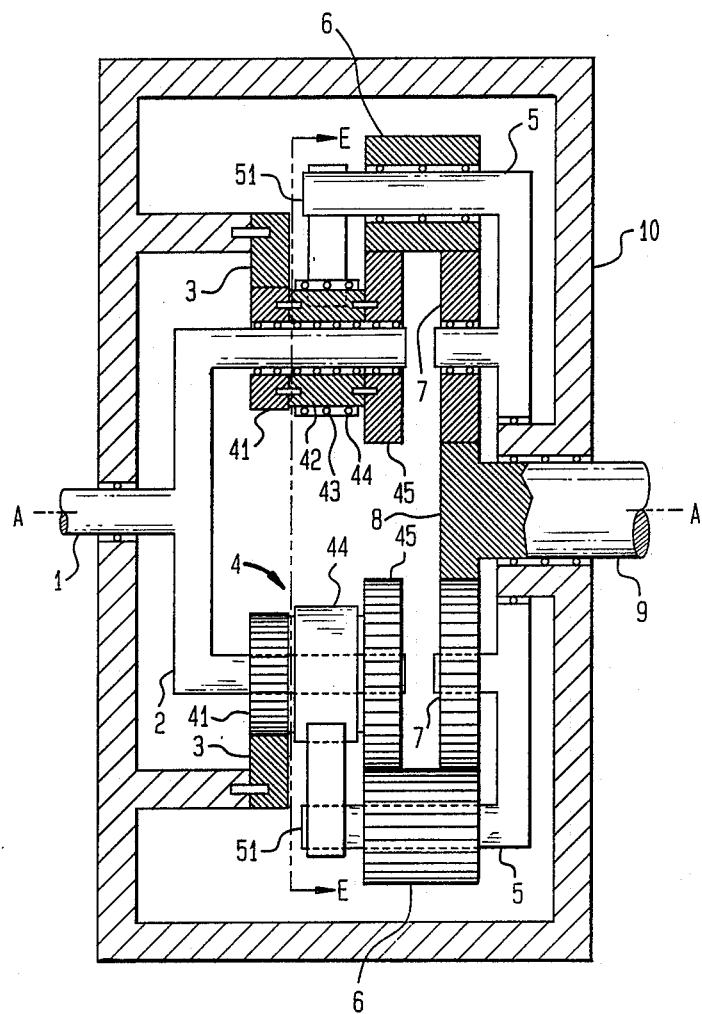
FIG. 1 is a longitudinal sectional view of the horse power amplifier of the present invention with cross cut view above line AA exposing the detail.

These drawings illustrate only a means required to construct the geometry of the present invention and are not representative of the only means. Various variations providing the required means will become evident to persons skilled in the art which are too numerous to illustrate, therefore, are not illustrated.

DESCRIPTION OF THE EMBODIMENT

The essence of the present invention is a driven driver gear of radial helical velocity and force on an idler carrier at a very large radial separation relative to the axis of its driving means. The driving means is a simple planetary with a braked ring gear and modified with a compound iso-planet whose tangential forces of the moment on its particular concentric compound components diameters displaced around the instantaneous tangenially moving axis over the braked ring gear, at a predetermined separation inward and outward from the instantaneous axis determining their magnitude relative to driving force at the driven point, are the driving forces driving the driver gear and causing its radial helical velocity and force that translate into pure tangential power around the axis of the driving means and by which the output element is driven.

In the drawings, see FIG'S. 1 and 2, a present invention horse power amplifier housed in a casing 10 with means to mount a planetary gear train, comprising a centrally positioned pinned ring gear 3 whose axis defines the system axis. Concentric to the ring gear 3 axis through an opening protrudes a rotatable suitably journaled input shaft 1 providing means of connection with a rotating power source and to which carrier 2 is rigidly affixed. On carrier 2 providing a means a suitably journaled rotatable iso-planet 4 is mounted. Comprising a gear 41 meshing with ring gear 3, an angular rotation isolation system, comprising a hub 42 pinned to gear 41, a bearing 43 pressed-fitted over hub 42 and a coupling 44 of suitable non circular outer shape, press-fitted over the outer rim of bearing 43 which is isolated by a frictionless agent from the hub 42 and a larger by at least one tooth gear 45 pinned to hub 42. Concentric to the system axis on means provided on the wall opposite shaft 1 of casing 10 a rotatable carrier 5 is mounted with means for: a rigidly affixed suitable coupling mate 51 to bidirectionally contact couple carrier 5 with the coupling 44 on iso-planet 4 in a position perpendicular to a point on the driven radius of iso-planet gear 41, at a radius equal to at least a fraction of one of its teeth inward from the pitch radius of the pinned ring gear 3, also a rotatable long driver gear 6 meshed with the larger gear 45 of iso-planet 4 and a rotatable idler gear 7 meshed with the long driver gear 6 and concentric and opposite shaft 1 through an opening in the wall of casing 10, a rotatable output shaft 9 is protruding, providing means of connection with a ratable load and to which a keyed or the like output sun gear 8 is affixed and meshes with the idler gear 7 completing the mechanical link in the gear train to the input shaft 1.

Thus when power is applied to carrier shaft 1 it rotates carrier 2, which in turn rolls gear 41 of the iso-planet 4 over the pinned ring gear 3 around the system axis one full circle for one revolution of carrier 2. For which gear 41 also makes a number of revolutions around its center, in ratio of its size to the size of the pinned ring gear 3, causing hub 42 and the larger by one tooth iso-planet gear 45 make an equal number of revolutions around their centers, non-circular coupling 44 coupled to carrier 5 by coupling mate 51 and isolated from hub 42 by bearing 43 does not rotate around its center and pushes carrier 5 one revolution around the system axis carrying the long driver gear 6 and the idler gear 7 in the same direction and for the same one revolution of carrier 2, thus placing them in exactly the same tangential position throughout their displacement around the system axis with the iso-planet gear 45 or in a fixed position to each other. Driver 6 also driven by gear 45 around its center and driving gear 7 around its center and carried by carried 5 take on a speed of helical motion around the system axis. Of which, at the meshing points of iso-planet gear 45 with driver gear 6 and driver gear 6 with idler gear 7, the direction of their tangential speeds around their centers is opposite to direction of the tangential speed of carrier 5 around the system axis and of which, at the point of contact of gear 7 with the output sun gear 8, the tangential speed of gear 7 around its center is inverted in the direction of the speed of carrier 5 by gear 7, where it adds to the tangential speed of carrier 5 and drives the output sun gear 8 at an angular speed proportional to the sum of the angular speed of carrier 5, equal to the speed of carrier 2, plus the angular speed of the iso-planet gear 45 around its center in ratio to the output sun gear 8, multiplied by the number of revolutions gear 45 makes for one full circle over the pinned ring gear 3 in ratio of the size of gear 3 to gear 41. Therefore renders a speed reduction ratio "RS", $$RS = \frac{1}{\left[1 + \frac{G45}{G8} \times \frac{G3}{G41}\right]}$$

which is not a mechanical advantage or torque gain ratio of the system.

Mechanical advantage "M.A." of the system is developed by amplification of the tangential force "F" of the input torque "T" applied to the axle of iso-planet 4 by carrier 2 during its displacement around the instantaneous continually tangentially moving axis at the tooth of gear 45, which around the axis of moment of gear 41 at the pitch radius of gear 3 extends outward past the pitch radius of gear 3 and forms by its extended radius an output moment arm of a class one lever whose input moment arm is the radius of gear 41 from the (fulcrum) axis of the moment on gear 3 and by the ratio of the moment arms to the fulcrum of the moment amplifies the force "F" to amplified forced of magnitude $$F \times \frac{G41}{(G45 - G41)}$$

The amplified force at the tooth of gear 45 is applied to the driver gear 6 mounted on carrier 5 and drives gear 6 around its center as carrier 5 is being pushed around the system axis by iso-planet 4 through the isolated coupling 44 and coupling mate 51 positioned by choice to mate a fraction of the radius of gear 41 inward from the pitch radius of gear 3 with coupling 44, thus placing the driven point of carrier 5 between the driven point (the axle) of gear 41 radius and its axis of the moment on gear 3, instituting an output moment arm of a class two lever to the mating point. At which point a second amplified force of magnitude in ratio to the radius of the driven point on gear 41 pushes carrier 5 and forms the input moment arm to its axis of a class 3 level with an output moment arm to the axle of gear 6. Gear 7 on carrier 5 meshed with gear 6 inverts the direction of the first magnified force on gear 6 and transmits it to the output sun gear 8 where an output torque "$T_o$" is developed $$F \times \frac{G41}{G45 - G41} \times G8 \text{ rad.} = T_o$$

Rendering M.A.=$T_o$/T.
Which at shaft 9 translates to a larger output power in respect to the input power at shaft 1.

Figure 2:
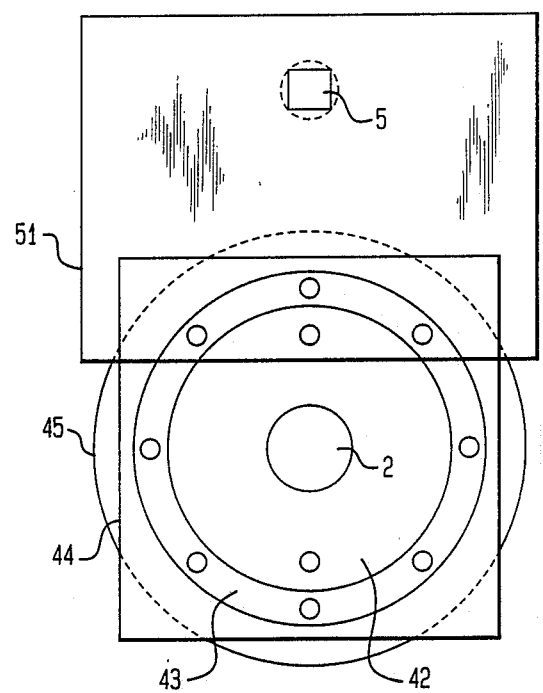
FIG. 2 is a front view of the isolation system of the iso-planet and coupling means of the idler carrier pulled out from between lines EE.
Figure 3:
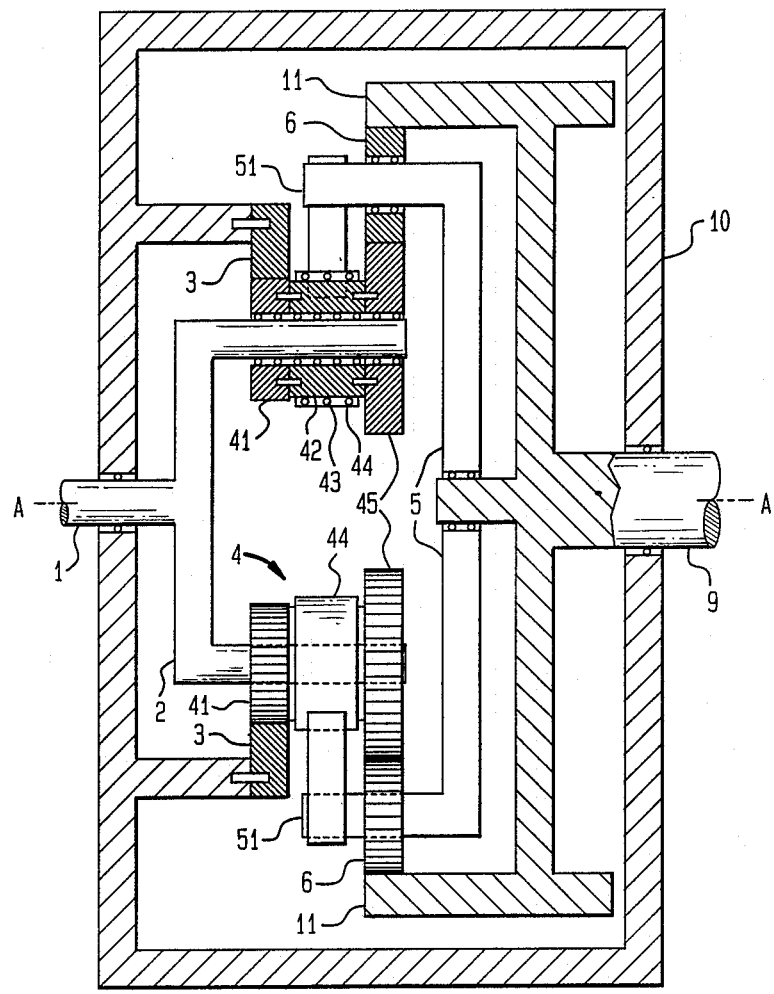
FIG. 3 is longitudinal section view of a variation of the present invention, employing a ring gear as the output element.

In FIG. 3 to the rotatable output shaft 9 a larger ring gear 11 is keyed of size equal to the radii of carrier 2, iso-planet gear 45 and the diameter of a driver gear 6 meshed with ring gear 11 and rotatably mounted on carrier 5, which is rotatably mounted on a bearing fitted on the inward protruding part of the rotatable output shaft 9, isolated from shaft 9, defining the axis of rotation of carrier 5 about the axis of shaft 9. In a powered state, the system complies to the angular speed reduction and torque gain expressions stated for FIG. 2, with substitution of the large ring gear 11 for the small gun gear 8. Ring gear 11 provides also an advantage for an easy conversion of its relative low angular speed into a high angular speed of a small output gear keyed to an output shaft rotatably affixed on casing 10, not shown, and driven by the large ring gear 11.

Many changes and modifications of the above will occur to those skilled in the art which are known to the inventor but are not described and are not desired to be described due to the number of variations.

Further, the description implies that the present invention violates the first law of thermodynamics. It does not. Herein are described the forces and their directions developed by the input power at their radial positions from their particular axes and their position of separation for the system axis, for which they are proportionally accelerated over and above the speed and force of the power at the input shaft. Thus defining potential energy of radial position in the system that is activated by the power at the input shaft and delivered at the output shaft as a sum of the two powers. Therefore the present invention is in compliance to the first law.

What I claim is:

1. A radial helix drive horse power amplifier comprising a casing, in which means are provided to house a planetary gear train with an input and output power means, comprising a centrally positioned pinned ring gear, whose axis defines a system axis of rotation of a system instituting the said planetary gear train, concentric to the said system axis, a rotatable input shaft protruding outside the said casing providing means for connection with a power source and to which an input carrier is rigidly affixed and provides means to mount a rotatable compound iso-planet of one piece construction, comprising a planet gear, which meshes with the said pinned ring gear and to which, a larger by at least one tooth planet gear, whose teeth extend outward past the pitch radius of the said pinned ring gear and a hub are pinned to whose rim an angular rotation isolation system isolating its rotation around its center is bonded, comprising a bearing and a non-circular coupling, which is bonded to the outer rim of the said bearing and provides an isolated, by a frictionless agent of the said bearing, means of mating with the said iso-planet inward from the said pitch radius of the pinned ring gear, concentric to the said system axis an idler carrier is rotatably mounted and where at means are provided for a coupling mate, rigidly secured to the said idler carrier and mates with the said non-circular coupling of the iso-planet, making the said idler carrier slave to the tangential displacement of the said iso-planet, a rotatably mounted driver gear meshed with the said larger iso-planet gear outward past the said pitch radius of the pinned ring gear and a rotatably mounted idler gear meshed with the said driver gear and concentric to the said system axis, an output sun gear, meshed with the said idler gear and rigidly affixed to a rotatable output shaft, which protrudes outside the said casing and provides means of connection with a load.

2. A horse power amplifier as claimed in claim 1, wherein a rotatable ring gear is rigidly affixed to an output shaft.

3. A horse power amplifier as claimed in claim 1, where at in a powered state, the angular speed of the output shaft is a multiple of the angular speed of the input shaft, predetermined by a ratio of gear sizes in the said planetary gear train, specifically the ratio of the said pinned ring gear to the said smaller iso-planet gear and the ratio of the said larger iso-planet gear to the said output gear, plus one for one revolution for the said input carrier and for which the said idler carrier makes one revolution carrying the said driver and idler gears and imposing a radial helical velocity on them.

4. A horse power amplifier as claimed in claim 1, where at, in the said powered state, the output torque at the said output shaft is a multiple magnitude of the input torque at the said input shaft, predetermined by the amplification of tangential force of the said input torque in the said gear train, an amplified force specifically amplified by a ratio of radii from an axis of the moment at the pitch radius of the said pinned ring gear, a radius to the center of the said smaller iso-planet gear and a radius of the said larger iso-planet gear extending outward past the said pitch radius to the meshing point with the said driver gear, of size equal to the radius of the said larger iso-planet gear minus the radius of the said smaller iso-planet gear and driving the said driver gear by the said amplified force about its center and which in turn drives directly or through an idler gear the said output gear, where at the said output torque of multiple magnitude is rendered and a second amplified force, applied to the said idler carrier through the said coupling mate mated with the said non-circular coupling of the iso-planet in a position chosen to be a fraction of the said radius of the smaller iso-planet gear inward from the said axis of the moment at the pitch radius of the pinned ring gear, defines the size of a driving radius of the said iso-planet at which point in ratio to the said tangential force of the input torque at the said radius of the smaller iso-planet gear is the said second amplified force driving the said idler carrier carrying the said idler gear.

5. A horse power amplifier as claimed in claim 1, wherein the output horse power at the output shaft is a multiple of the horse power applied to the input shaft, which is defined by the amplified magnitude of horse power components, speed and torque, at the said output shaft in respect to the magnitude of the said horse power components at the said input shaft.

* * * * *